US012587301B2

(12) United States Patent
Pez et al.

(10) Patent No.: US 12,587,301 B2
(45) Date of Patent: Mar. 24, 2026

(54) OPTOELECTRONIC MODULE CONFIGURED TO OPERATE SIMULTANEOUSLY AT HIGH-SPEED BIT RATE AND LOW SPEED BIT RATE

(71) Applicants: RADIALL USA, Inc., Tempe, AZ (US); RADIALL, Aubervilliers (FR)

(72) Inventors: Mathias Pez, Cheshire, CT (US); Michael Decarlo, Coventry, CT (US); William Stadtler, Guilford, CT (US)

(73) Assignee: RADIALL, Aubervilliers (FR)

( * ) Notice: Subject to any disclaimer, the term of this patent is extended or adjusted under 35 U.S.C. 154(b) by 69 days.

(21) Appl. No.: 18/158,509

(22) Filed: Jan. 24, 2023

(65) Prior Publication Data

US 2024/0250771 A1    Jul. 25, 2024

(51) Int. Cl.
| | |
|---|---|
| *H04B 10/07* | (2013.01) |
| *G02B 6/42* | (2006.01) |
| *H04B 10/40* | (2013.01) |
| *H04J 14/02* | (2006.01) |
| *H04J 14/04* | (2006.01) |

(52) U.S. Cl.
CPC ............ *H04J 14/04* (2013.01); *G02B 6/4246* (2013.01); *H04B 10/07* (2013.01); *H04B 10/40* (2013.01); *H04J 14/021* (2013.01)

(58) Field of Classification Search
CPC .. H04B 10/50–503; H04B 10/60–6973; H04B 10/40; H04B 10/43

USPC .................................. 398/135–164, 182–214
See application file for complete search history.

(56) References Cited

U.S. PATENT DOCUMENTS

| | | | | |
|---|---|---|---|---|
| 6,031,645 | A | * | 2/2000 | Ichikawa ............ H04J 14/0298 |
| | | | | 398/139 |
| 7,309,169 | B2 | | 12/2007 | Toillon et al. |
| 2008/0002977 | A1 | * | 1/2008 | Mori ................... H04J 14/0226 |
| | | | | 398/71 |
| 2008/0267620 | A1 | * | 10/2008 | Cole .................. H04B 10/0775 |
| | | | | 398/17 |
| 2008/0285979 | A1 | * | 11/2008 | Suzuki ............. H04B 10/25751 |
| | | | | 398/140 |
| 2011/0142443 | A1 | * | 6/2011 | Hirth ...................... H04B 10/69 |
| | | | | 380/283 |
| 2015/0295647 | A1 | * | 10/2015 | Parekh ............. H04B 10/25891 |
| | | | | 398/142 |
| 2016/0080843 | A1 | * | 3/2016 | Charbonneau-Lefort ................... |
| | | | | H04B 10/695 |
| | | | | 398/45 |
| 2020/0295832 | A1 | * | 9/2020 | Bai ........................ H04B 10/27 |
| 2023/0388019 | A1 | * | 11/2023 | Li ......................... H04B 10/501 |

* cited by examiner

*Primary Examiner* — Li Liu
(74) *Attorney, Agent, or Firm* — Chrisman Gallo Tochtrop LLC

(57) ABSTRACT

The application relates to a unique optoelectronic module configured to operate simultaneously at high-speed bit rate and low speed bit rate, thanks to a reconfigurable system on a chip, i.e. a programmable unit on a chip. This reconfigurable system embeds the electronic circuitry of the low-speed channel(s), i.e. at least the driver when the link is a transmission channel, or at least the amplifier when the link is a receiver channel.

12 Claims, 2 Drawing Sheets

OPTOELECTRONIC MODULE CONFIGURED TO OPERATE SIMULTANEOUSLY AT HIGH-SPEED BIT RATE AND LOW SPEED BIT RATE

TECHNICAL FIELD

The present invention relates to an optoelectronic module which combines channels working at different data speed rates.

The term "optical sub-assembly", or OSA, is used to describe a sub-assembly grouping one or more optoelectronic component(s) and its optical coupling system with one or more optical fibers.

The invention relates to a optoelectronic module to be implemented notably in the field of aeronautics, space, defense, monitoring, transport or the medical field or furthermore the field of telecommunications, the field of data communications and the field of industry.

PRIOR ART

Optical link systems are known to use optoelectronic modules and an optical link formed by one or more optical fibers. Each optoelectronic transmitter or receiver or transceiver module is composed of an electronic board, of an optoelectronic component and of its control electronic component, of one or more optical fibers, which may be 'daisy-chained', and of an optical coupling device between the optoelectronic component and the optical fiber or fibers.

Each module is then fixed by brazing or glueing or by means of an electrical connector onto an application board.

A functional optical link system thus comprises at least one transmitter module and at least one receiver optically coupled to the transmitter module via a fiber-optic medium.

The commercial products called D-Lightsys® marketed by the applicant RADIALL relate to transmitters or receivers or transceivers, these transceivers integrating both transmitter and receiver functions.

Today, on one part, some optoelectronic modules are dedicated to transmit/receive only high-speed data signals, typically with rate from 100 Mbps (Megabytes per second). These modules include specific electronic components which are not configured to deal with DC (direct current) components of electrical signal.

And, on the other part, some optoelectronic modules are dedicated to transmit/receive only low speed data signals, typically with rate from DC up to 10 Mbps.

It means that in a given application, if it is required to deal with both high and low speed data rates, two different modules are necessary, which is constraining in terms of cost, space and energy consumption.

There is therefore a need to further improve the optoelectronic modules, notably to allow the possibility to deal with both high and low speed data rates without having to implement two different modules, one dedicated to the high-speed data rates and the other to the low-speed ones.

The invention aims to address all or some of this need.

EXPLANATION OF THE INVENTION

The subject of the invention is thus an optoelectronic module, comprising:
a host printed circuit board (PCB);
an electronic die, which is configured to the electronic processing of data at high-speed rate;

at least one optoelectronic sub-assembly (OSA) that resides on the host PCB, said OSA comprising:
at least one channel dedicated to data at high-speed rate,
at least one channel dedicated to data at low-speed rate,
at least one optical media and alignment means configured to align each active area of the optoelectronic die with the at least one optical transport media,
a reconfigurable system on a chip (RSOC) that resides on the host PCB, which is configured to embed the functions of the electronic processing of the low-speed data and to control the electronic processing of both the high speed and low speed data.

According to an advantageous embodiment, the OSA comprises a transmitter section (Tx) and a receiver section (Rx), one of the transmitter section (Tx) and of the receiver section (Rx) is configured to transmit data at high-speed data rate, whereas the other section is configured to receive a low speed signal.

Preferably, the module includes an optical fiber with an optical connector.

Preferably also, the OSA includes an optical fiber pigtail with one end is terminated with a ferrule accommodated and hold in a support that resides on the host PCB.

According to advantageous variant, the electronic die comprises a driver to monitor an optoelectronic element of one of the data channels. the optoelectronic element which is controlled by the driver is a Vertical Cavity Surface Emitting Laser (VCSEL). one of the data channels includes a photodiode as an optoelectronic element and an amplifier configured to amplify the photodiode.

Low-speed data rate runs preferably from DC to 10 Mbps and high speed data rate runs preferably from 100 Mbps to 10 Gbps.

According to a preferred variant, the RSOC includes a temperature compensation feature.

Preferably, the RSOC is configured to monitor the data channels based on the optical data received at one of the channels.

RSOC can be remotely reconfigured through the optical path, which include a specific key data message, when received at one of the channels.

According to a preferred configuration, the host PCB is a part of a unique package including a cover which protects all the components that reside on the host PCB.

According to another preferred configuration a single optical fibre is used for two channels, to both transmit and receive the high speed and low speed data, such that the module is configured as a bidirectional transceiver.

In other words, the invention consists in a unique optoelectronic module with optical links of high-speed data rate and low speed data rate and with a reconfigurable system on a chip, i.e. a programmable unit on a chip. This reconfigurable system embeds the electronic circuitry of the low-speed channel(s), i.e. at least the driver when the link is a transmission channel, or at least the amplifier when the link is a receiver channel. Moreover, the reconfigurable system controls these high-speed electronic components, taking into account parameters, such as temperature, laser and/or receive optical parameters such as bias currents, etc.

In that sense, the optoelectronic module according to the invention is asymmetrical for the speed data rates, i.e., two sections which operate at different speed data rates, one being low the other being high.

The module can integrate transmitter links only or receiver links only. And because the reconfigurable system is able to control more than two channels, the invention is not limited to two links but can be applied to VCSEL or photodiode arrays or to multiple optoelectronic dies.

According to a preferred embodiment, the module comprises at least one receiver at low-speed data rate, the unique system is configured to retrieve information from the receiver data and process them internally to control the high-speed data rate section.

Moreover, the system can be reprogrammed internally, based on a specific trigger followed by the parameters of the new program transmitted by the low-speed data channel.

The main advantages obtained by the asymmetrical optoelectronic module according to the invention compared to the association of optoelectronic modules with high-speed rates with optoelectronic devices with low-speed rates, even in only one packaging, are numerous and can be itemized as follows:

reduction of the total number of electronic components since the reconfigurable system on a Chip embeds the low-speed electronic chain(s), and ensure the monitoring and the control of the high-speed side;

one reconfigurable system only is necessary to use for multiple channels, i.e. more than one channel per side;

simplification of the PCB design, and even PCB structure with only one layer instead of multiple layers associated with multiple working frequencies of the electronic components. The main consequence is a significant reduction of the footprint of the complete device in accordance with the invention. For example, the footprint of a full hybrid duplex transceiver may be of the order of 10×13×3.5 mm3.

As a consequence of the reduction of the total number of electronic components and/or the use of a reconfigurable system on a chip, which is a standard component off the shelf, cost of the optoelectronic device is decreased.

Other direct consequences are a decrease of the power consumption and of heat dissipation.

Moreover, using a reconfigurable system allows control loops between high speed and low speed sides without additional die. When requested, the system may process internally the low speed data in order to monitor the high speed side.

DETAILED DESCRIPTION

Other advantages and features of the invention will become more apparent upon reading the detailed description of exemplary implementations of the invention, given as illustrative and non-limiting examples with reference to the following figures among which:

FIGS. 1 to 2 show an optoelectronic (transceiver) module 1 according to the invention, which can operate simultaneously at high-speed bit rate, preferably running from 100 Mbps to 10 Gbps, and low speed bit rate running from DC to 10 Mbps.

Figure 1:
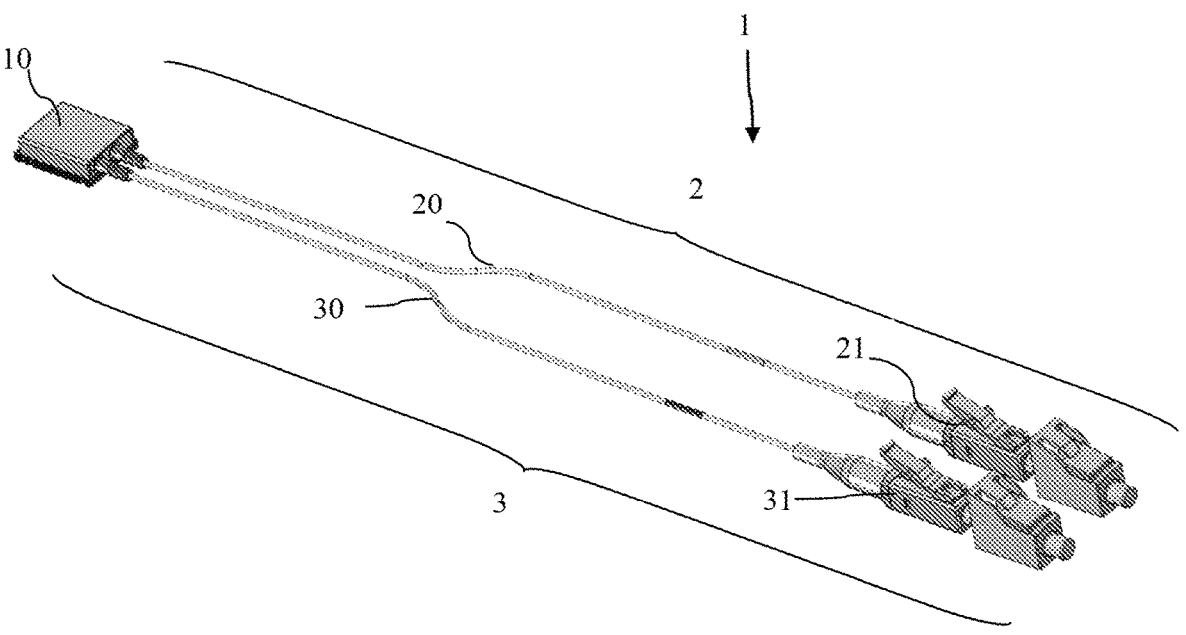
FIG. 1 is a perspective view of an example of an optoelectronic (transceiver) module according to the invention equipped with two optical fiber pigtails.
Figure 2:
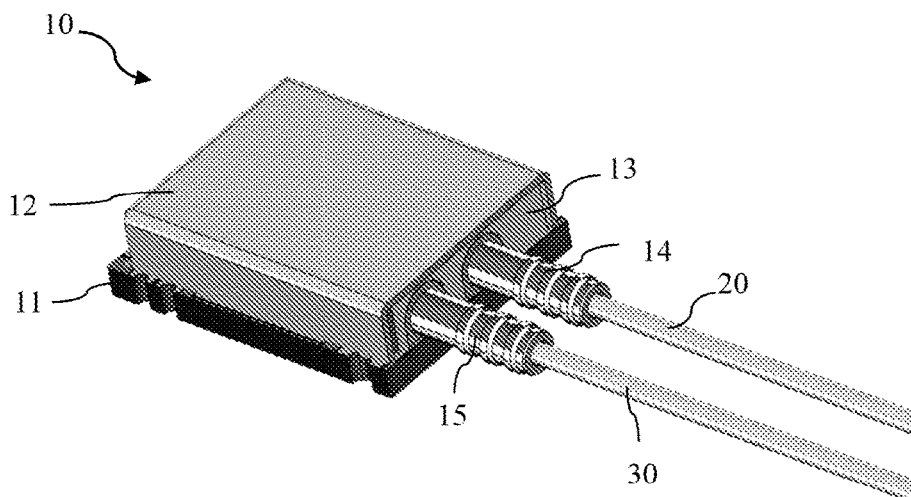
FIG. 2 is a detailed view of FIG. 1.

As shown, the transceiver module 1 comprises a unique package 10 including a host PCB 11 and a cover 12 which protects all the components that reside on the host PCB 11.

A support 13 under a T general shape resides also on the host PCB 11 and supports two holding and crimp sleeves 14, 15.

In the illustrated embodiment of FIG. 1, the package 10 includes optical fiber pigtails (not represented) with their connectorized ends connected to the optical cable assemblies 20 and 30 through the holding tubes 14 and 15. Connectors 21, 31 of the cable assemblies may be LC connectors.

In another embodiment, the package is pigtailed, i.e. the pigtails with their connector end directly exit the package.

In another embodiment, the optical fibers are connectorized to the package.

Figure 3:
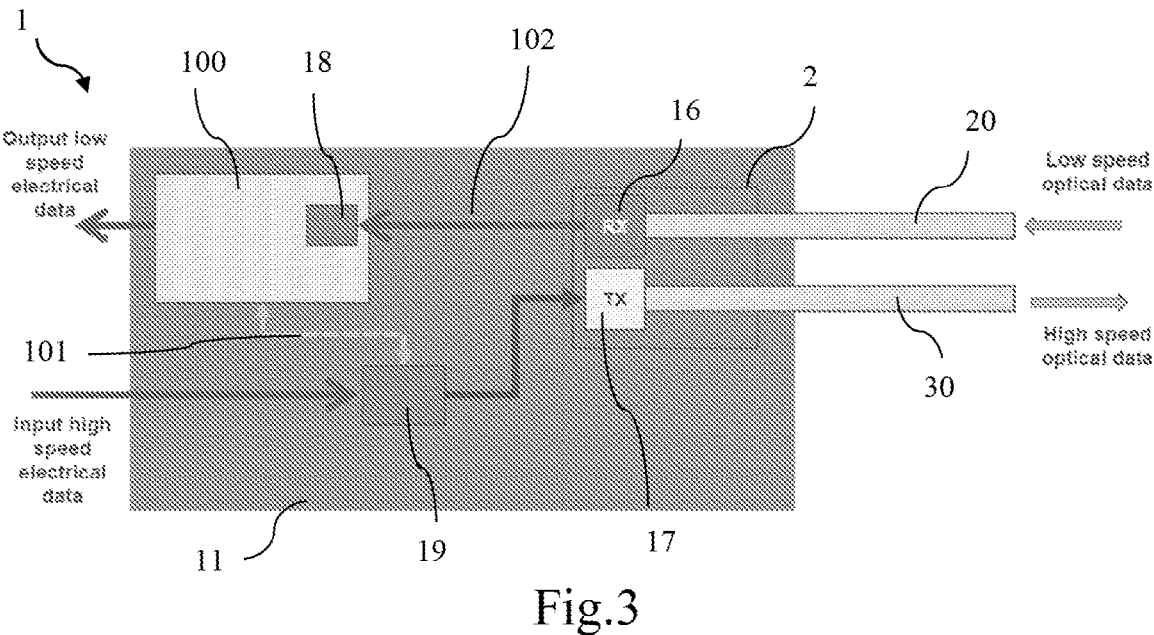
FIG. 3 is a functional diagram of the optoelectronic module according to the invention representing a first embodiment which a receiver section (Rx) is dedicated to low-speed optical data whereas a transmitter section (Tx) is dedicated to high-speed optical data.

FIG. 3 show the functional diagram of the optoelectronic module 1 representing the first embodiment.

In this first embodiment, the module 1 comprises an optical subassembly (OSA) 2 received on the host PCB 11. The OSA comprises a receiver section Rx configured to receive data at low-speed rate and a transmitter section Tx configured to transmit data at high-speed rate, whose optoelectronic components are arranged side-to-side in the OSA which is bonded on the host PCB.

The receiver section (Rx) includes an optoelectronic component 16 which is a photodiode.

The transmitter section (Tx) includes an optoelectronic component 17 which is a Vertical Cavity Surface Emitting Laser (VCSEL).

According to the invention, a reconfigurable system on a chip (RSOC) 100 that resides on the host PCB 11, is configured to embed the functions of the electronic processing of the low-speed data and to control the electronic processing of both the high speed and low speed data.

Thus, the photodiode 16 is electrically connected to the RSOC 100, which retrieves the data (low speed rate) from the photodiode 16 through an embedded amplifier 18.

An electronic die is configured to the electronic processing of data at high-speed rate. Said die comprises a laser driver 19.

According to the invention, the RSOC 100, in addition to its low speed receiving functions, is interfaced with the high-speed data rate components of the laser driver 19 which monitors the VCSEL 17.

The interfacing is preferably made by at least one managing and controlling loop 101 which electrically links the RSOC 100 to the laser driver 19.

A trigger flag and/or a new program can be implemented to the RSOC 100, through a loop 102.

Figure 4:
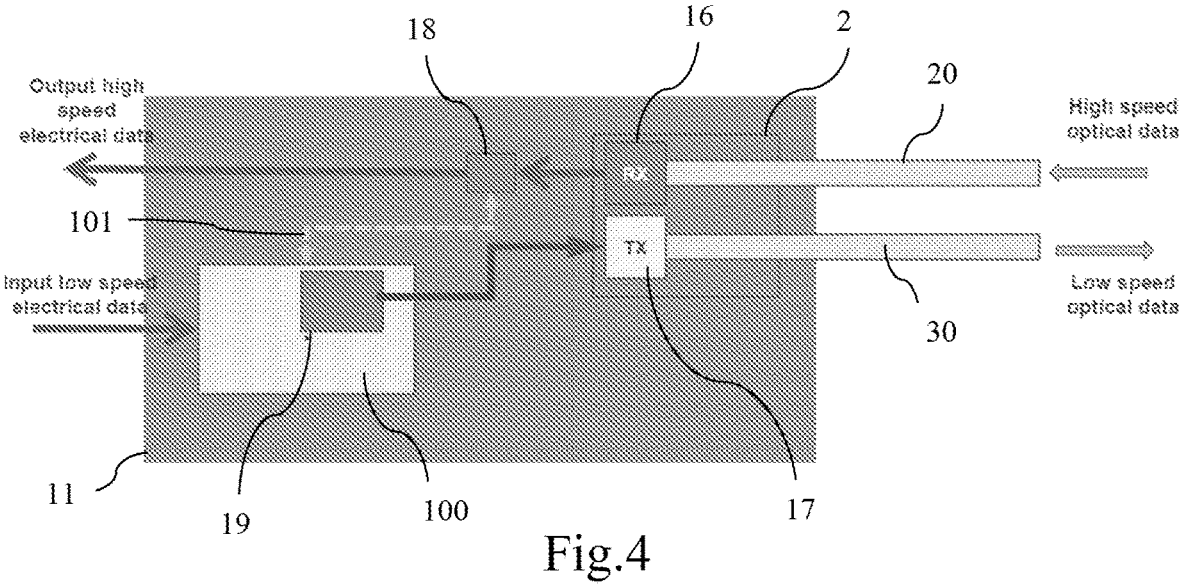
FIG. 4 is a functional diagram of the optoelectronic module according to the invention representing a second embodiment according to which a receiver section (Rx) is dedicated to high-speed optical data whereas a transmitter section (Tx) is dedicated to low-speed optical data.

FIG. 4 shows an alternative embodiment, wherein the receiver section Rx is configured to receive data at high-speed rate whereas the transmitter section Tx is configured to the transmit data at low-speed rate with the same electronic and optoelectronic components and RSOC 100 such as described with reference to FIG. 3.

In a preferred embodiment, the RSOC 100 may internally process the data of the receiver section (Rx), in order to control the data of the transmitter section (TX) of the same module when the optical high speed data rate link is dependent on the optical low speed data rate link. This processing can be made by a UART code for example.

Moreover, a unique RSOC 100 may be interfaced with many high speed data links, with many optoelectronic dies and their associated electronic chains thanks to its interconnect matrix part. In this configuration, this component allows to reduce the number of dies on the PCB. The cost and the footprint are reduced.

In an advantageous variant, in the configuration of a transceiver, i.e a dual transmitter/receiver configuration, a single optical fibre may be used to transmit and receive the high speed and low speed data, even at the same wavelength, using one of the geometrical arrangement, such as described in the U.S. Pat. No. 7,309,169. This even more decreases the footprint of the whole module, especially when multiple dual transmitters are integrated in one device. Moreover, it allows a reduction of the total number of fibres.

Advantageously, the RSOC 100 is configured to implement a temperature compensation feature for the transmitter section Tx or receiver section Rx, dedicated to data at high-speed rate. Thus, the high-speed section Tx or Rx incorporates a temperature compensation mode that will adjust the optical power, modulation, and optical peaking through the VCSEL 17 based on the temperature of the module 1.

In the embodiment of FIG. 3, wherein the receiver section Rx is dedicated to low-speed data, the signal may include a specific key data message, in order to trigger a bootloader mode to the RSOC 100.

Thus, a RX signal with the reprogramming data can reconfigure the RSOC 100. This remote configuration of the RSOC 100 allows users to not be obliged to uninstall the module 1, which is usually physically inaccessible, in order to modify the software of the RSOC 100.

Other variants and enhancements can be provided without in any way departing from the framework of the invention.

By example, the transceiver module 1 is not limited to one receiver channel in the section Rx and one transmission channel in the section Tx. Thus, for example, one Rx channel with multiple Tx channels in a single module can be foreseen.

By another example, the low data rate section and the high data rate section can be both receiver sections or both transmitter sections.

Many kinds of optical channels can be envisaged. Thus, a module 1 can be pigtailed as well, i.e. the internal fibres aligned with the photodiode or VCSEL, or any optoelectronic die may be implemented external to the module with individual connectors at their extremities.

Moreover, the transceiver module 1 is compatible with any kind of fiber optic connections, not limited to LC connectors as shown. Any of the known connector types including SC, FC, ST, MU, MTRJ, and MTP can be implemented.

The transceiver module 1 is also compatible with any kind of optical fibers, for example with core of 50 micron, or 62.5 micron . . . . The optical fibers of the OM type (OM1, OM2, OM3, OM4, OM5) are convenient in the framework of the invention.

The expression "comprising a" should be understood to be synonymous with "comprising at least one", unless otherwise specified.

The invention claimed is:

1. An optoelectronic module, comprising:
a host printed circuit board (PCB);
an optoelectronic die, which is configured to an electronic processing of data signals at high-speed rate;

at least one optoelectronic sub-assembly (OSA) that resides on the host PCB, said OSA comprising:
at least one channel dedicated to transmission of data signals at high-speed rate,
at least one channel dedicated to transmission of data signals at low-speed rate,
at least one optical media and alignment means configured to align each active area of the optoelectronic die with the at least one optical media,
a reconfigurable system on a chip (RSOC) that resides on the host PCB, which is configured to embed functions of electronic processing of the low-speed data signals and to control the electronic processing of both the high speed and low speed data signals, and wherein the RSOC can be remotely reconfigured through an optical path, which include a specific key data message, when received at the at least one channel dedicated to transmission of data signals at low-speed rate.

2. The optoelectronic module according to claim 1, wherein the OSA comprises a transmitter section (Tx) and a receiver section (Rx), one of the transmitter section (Tx) and of the receiver section (Rx) is configured to transmit data signals at high-speed data rate, whereas the other section is configured to receive a low speed data signals.

3. The optoelectronic module according to claim 1, wherein the module includes an optical fiber with an optical connector.

4. The optoelectronic module according to claim 1, wherein the OSA includes an optical fiber pigtail with one end is terminated with a ferrule accommodated and hold in a support that resides on the host PCB.

5. The optoelectronic module according to claim 1, wherein the electronic die comprises a driver configured to control an optoelectronic element of one of the data channels.

6. The optoelectronic module according to claim 5, wherein the optoelectronic element which is controlled by the driver is a Vertical Cavity Surface Emitting Laser (VCSEL).

7. The optoelectronic module (according to claim 1, wherein one of the data channels includes a photodiode as an optoelectronic element and an amplifier configured to amplify the photodiode.

8. The optoelectronic module according to claim 1, wherein low-speed data rate runs from DC to 10 Mbps and high speed data rate runs from 100 Mbps to 10 Gbps.

9. The optoelectronic module according to claim 1, wherein the RSOC includes a temperature compensation feature.

10. The optoelectronic module (according to claim 1, wherein the RSOC is configured to monitor the data channels based on the optical data received at one of the channels.

11. The optoelectronic module according to claim 1, wherein the host PCB is a part of a unique package including a cover which protects all the components that reside on the host PCB.

12. The optoelectronic module according to claim 1, wherein a single optical fibre is used for two channels, to both transmit and receive the high speed and low speed data signals, such that the module is configured as a bidirectional transceiver.

* * * * *